Feb. 5, 1963 J. L. PUTMAN ET AL 3,076,894
GAMMA RAY THICKNESS GAUGES
Filed March 28, 1954 3 Sheets-Sheet 2
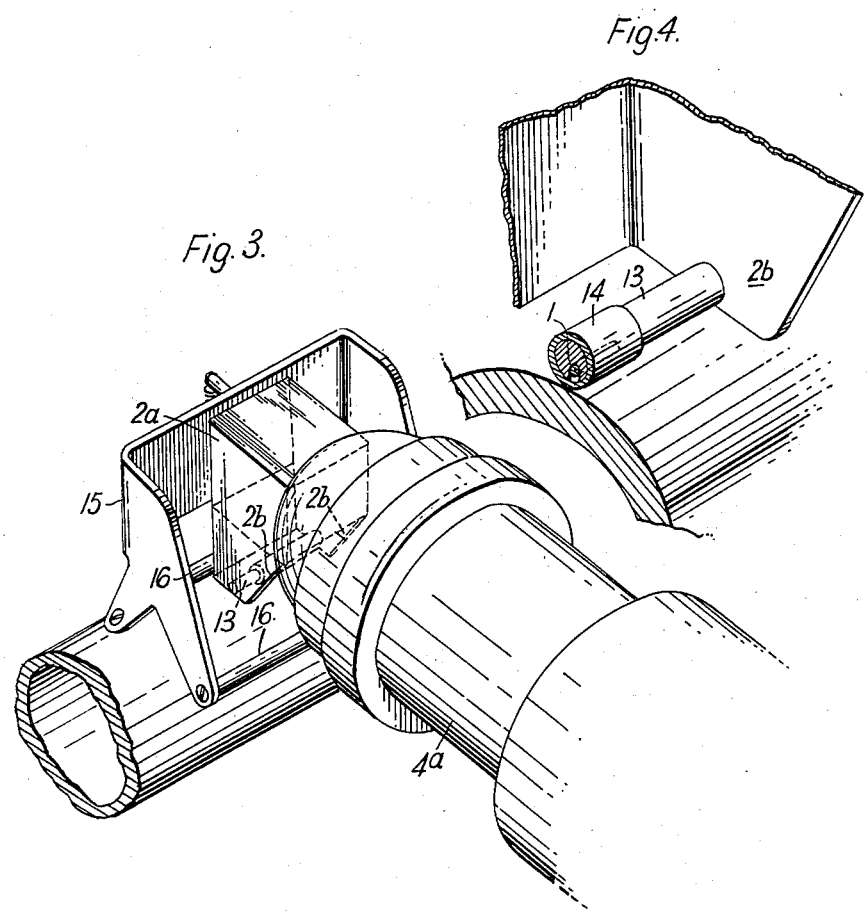
Inventors
JOHN LABAN PUTMAN,
SIDNEY JEFFERSON,
RICHARD BRUCE OWEN,
By
Robert B Pearson
Attorney

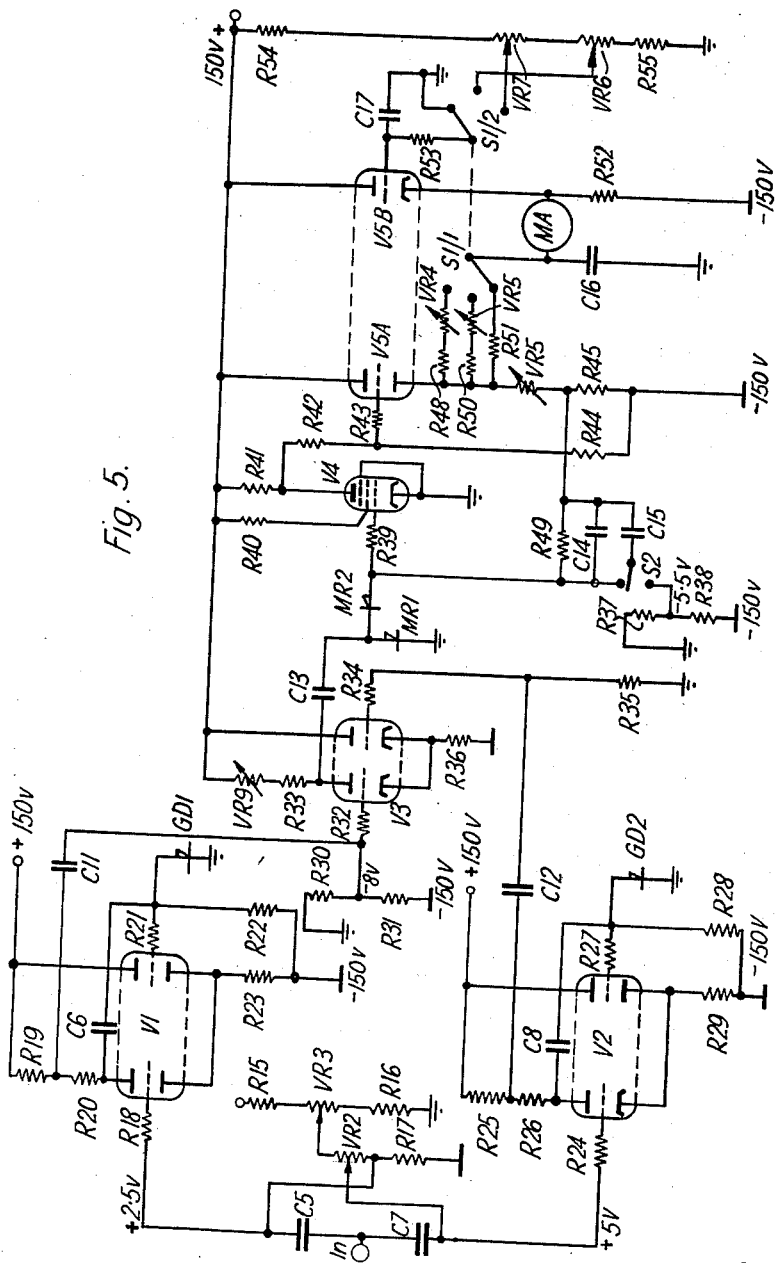

3,076,894
GAMMA RAY THICKNESS GAUGES
John Laban Putman, Sidney Jefferson, and Richard Bruce Owen, Abingdon, England, assignors to United Kingdom Atomic Energy Authority, London, England
Filed May 28, 1954, Ser. No. 433,167
Claims priority, application Great Britain June 24, 1953
4 Claims. (Cl. 250—71.5)

This invention relates to gamma ray thickness gauges and is concerned with such gauges which operate on the back-scatter principle and may be employed to measure the thickness of an article from one face without having access to the other face. Such a facility is, for example, desirable for a gauge for measuring the wall thickness of pipe.

Back-scatter gamma ray thickness gauges comprise essentially a source of gamma rays, a detector of such rays, and a shield therebetween to prevent direct excitation of the detector by the source. The gauge is arranged in relation to an article to be measured such that gamma rays are incident at acute angles upon the article over a region opposite the shield and are back-scattered at acute angles in the direction of the detector on the other side of the shield. There is a conflict of requirements, the mean angle through which the rays are deflected or scattered is required to be as small as possible since the energy of the back-scattered particles is a function of the angle of scatter whereas the source is required to be as near as possible to the detector in order that it may be of minimum strength and require the minimum of shielding from the operator.

The present invention avoids the use of a screen between the source and the detector by providing pulse analysing means in the output of the detector whereby those pulses due to back-scatter are discriminated from those due to direct excitation of the detector from the source. Consequent advantages of the invention are that the source may be placed close to both the article and the detector and therefore of low enough strength not to require shielding from an operator. Also, since the source, detector and article may be close together, the area of inspection is more localised.

A back-scatter gamma ray thickness gauge in accordance with the present invention comprises a small source of gamma radiation and a gamma ray energy sensitive detector mounted such that the detector is exposed to direct radiation from the source, the source can be placed in close proximity to a point on the surface of an article the thickness of which is to be measured and the detector can be positioned on a line substantially normal to the surface at that point, a pulse amplitude analyser for rejecting from a pulse series derived from said detector those pulses caused by direct excitation of the detector by the source and means for indicating the count rate of the remaining pulses.

Those gamma rays received by the detector so positioned are of minimum energy but, as will hereinafter be explained they produce pulses of an amplitude range distinct from those produced by direct excitation thus enabling them to be segregated by a pulse amplitude analyser.

The energy sensitive detector preferably comprises a crystal, associated with a photomultiplier and a ratemeter, to constitute a scintillation counter, the pulse amplitude analyser being provided in the circuit between the photomultiplier and the ratemeter.

The source may conveniently comprise a needle of cobalt 60 contained in as thin a protective sheath as possible so that it may be placed in very close proximity to the surface of the article to be measured and may therefore be of minimum strength in relation to the thickness of the article to be measured and in general will require no shielding from an operator.

The count rate of the pulses remaining after rejection of those due to thermal noise and direct photoelectric excitation of the detector is the sum of a pulse rate due to back-scattered gamma rays and a pulse rate due to Compton recoil electrons produced by the direct excitation. This latter pulse rate is a constant for a given source strength and may be eliminated from the ratemeter scale reading by arranging for the scale zero to coincide with said constant rate when no article is in the proximity of the gauge. A feature of the invention is the provision of means for adjusting the ratemeter response in reverse proportion to the Compton recoil count rate to obtain a zero reading when no article is present and in this way to compensate the response of the gauge to back-scattered radiation for radioactive decay of the source.

The invention will be further described with reference to the accompanying drawings wherein:

FIG. 3 is a perspective view, by way of example, of a practical construction of measuring head in accordance with the invention, comprising a radioactive source and scintillation counter designed for measuring the thickness of pipe walls.

FIG. 4 is a perspective view to an enlarged scale of a fragment of FIG. 3, and

FIG. 5 is a circuit diagram of the pulse amplitude analyser 11 and ratemeter 12 of FIG. 1.

Figure 1:
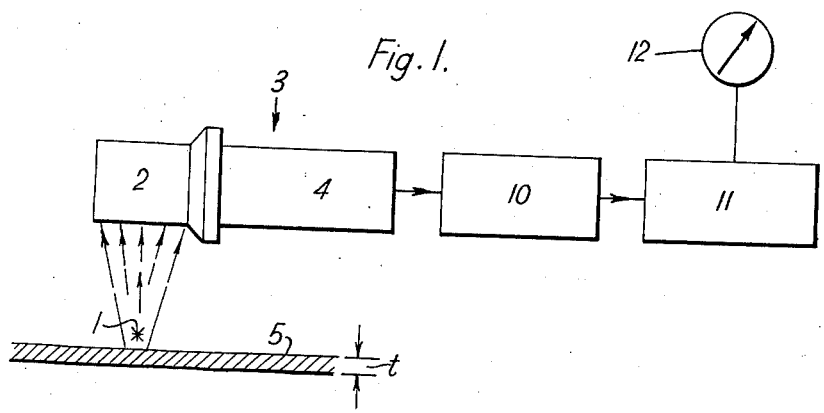
FIG. 1 is a diagrammatic view showing an embodiment of the invention.

Referring to FIG. 1 a gamma ray source 1 is mounted below the crystal scintillator 2 of a scintillation counter 3 comprising an electron multiplier photocell 4. The mounting for the source 1 is not shown in the diagram but it is such as to enable the source to be brought into close contact with the surface of an article 5 the thickness of which is to be measured. The mounting is such that there is no masking of the surface adjacent the source either from the crystal or from the source.

The article 5 is thus directly exposed at the closest possible range to gamma rays from the source and a proportion of these rays dependent on the thickness of the article are back-scattered. The energy of the back-scattered rays is a minimum for those scattered in a direction normal to the surface and the crystal 2 is mounted to receive a solid cone of such rays, the axis of the cone being normal to the surface. The source 1 is of small dimensions compared with the crystal 2 and thus casts a negligible self-shadow. The crystal is also, of course, exposed to direct gamma radiation from the source.

Figure 2:
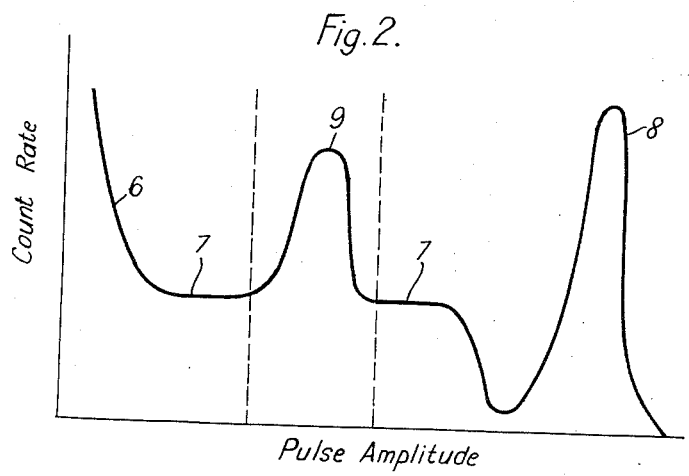
FIG. 2 is a "differential bias curve" illustrating the relationship between the count rate and the amplitude of pulses derived from the photomultiplier of the embodiment shown in FIG. 1.

FIG. 2 shows the relationship between count rate and pulse amplitude for the output of the photomultiplier 4 under typical conditions using $Cs^{137}$, .661 mev. gamma ray source. There is a region 6 of high count rate at low amplitude due to thermal noise followed by a plateau 7 of substantially steady count rate at increasing amplitude due to Compton recoil electrons. At the maximum amplitude there is a peak 8 (two peaks in the case of cobalt) due to direct photoelectric excitation and at a point on the plateau 7 there is a peak 9 due to back-scatter of an amplitude above the plateau which increases with the thickness of the article being measured.

As shown in FIG. 1 the output of the photomultiplier is fed to a linear pulse amplifier 10 and then to a pulse amplitude analyser 11 which passes a single amplitude channel represented by the broken lines in FIG. 2. The pulse rate of this single channel output from the analyser is indicated on a rate meter 12.

It will be evident that the indicated pulse rate is the sum of a "background" count due to Compton recoil electrons (plateau 7) and the back-scatter (peak 9). For a given source strength the height of the plateau 7 is constant and the height of the peak 9 above the plateau is a function of the thickness of an article. Thus by arranging for the meter 12 to read zero at the count rate obtained when no article is present, i.e. the count rate represented by the plateau 7, the meter can be calibrated to indicate the thickness of any part of an article of a given material on which the gauge is placed.

The preferred source is cobalt 60 having a half life of 5.3 years consequently there is a sensible reduction of strength over a period of, say, one year with a corresponding fall in the overall height of peak 9 for a given thickness.

There will, however, also be a proportionate fall in the level of the plateau 7 as the strength of the source diminishes. The apparatus of the invention takes advantage of this and uses a response control associated with the ratemeter 12 as the zero setting control as is hereinafter described with reference to FIG. 5. Thus the derived voltage which operates the ratemeter 12 may be brought to a constant level corresponding to zero indication irrespective of a falling level of the plateau 7 due to source decay and the calibration of the gauge is unaffected.

One practical form of mounting for the source and detecting element is shown in FIGS. 3 and 4. In FIG. 3 a standard photomultiplier tube type 6260 as manufactured by Electrical and Musical Industries Limited, is contained within a casing 4a formed with a holder 2a, consisting of a substantially cubical box with downwardly extending hood-like extension 2b, for a 1 inch cube sodium iodide crystal. A ⅛ inch diameter brass rod 13 extends between the side cheeks of the hood 2b and within a longitudinal slot in the underside of the rod 13 (FIG. 4) is a wire of cobalt 60 constituting a 21 µc. source 1. The cobalt wire is retained in the slot and protected by a thin (.01 inch wall) brass tube 14. The cobalt wire can thus be brought within about .020 inch of a surface and the dimensions of the hood 2b are such that the crystal is thus centred 2 inches from the surface.

The crystal holder 2a carries a locating frame 15 which is slotted to move vertically in relation to the crystal holder against the action of a spring. The frame 15 has forked side plates between the extremities of which are two aluminium rods 16.

In use the device is placed upon a surface such that the rods 16 are flat thereon and the casing 4a, 2a pressed downwards against the action of said spring until the brass tube 14 enclosing the source 1 touches the surface. The locating frame ensures that the gauge is correctly aligned with the surface. The meter 12 then indicates the thickness at the point of contact and by moving the gauge over the surface the thickness at any point can be determined. Although suitable for use with flat surfaces, the locating frame 15 shown in FIG. 3 is especially intended for application to pipes, such as the pipe 17 illustrated, the aluminium rods 16 being placed lengthwise of the pipe. The pipe may then be rotated slowly and the gauge moved along the pipe so as to scan the surface.

A suitable circuit for the pulse amplitude analyser 11 and ratemeter 12 particularly adapted for battery operation will now be described with reference to FIG. 5.

The analyser is arranged to respond to pulses at its input terminal IN of a maximum amplitude of 5 volts. The amplifier 10 (FIG. 1) therefore requires to have an overall gain of between ×100 and ×200 when used with the particular photomultiplier tube quoted above.

The analyser 11 comprises three double triodes V1, V2 and V3 type 12AT7 (Brimar). Valves V1 and V2 each operate as a univibrator type of amplitude discriminator. The left hand side of V1 is normally conducting in the absence of a signal on that grid while the right hand side is cut-off due to the cathode-coupled amplifying action of the circuit, and the positive bias of +2.5 volts on the left hand grid. A negative pulse of the correct amplitude arriving from the amplifier via C5 on to the left hand grid upsets the equilibrium of the circuit, and causes it to trip over so that the right hand side conducts for a duration determined by the circuit time constants. This duration is about 15 microseconds. A positive pulse of this duration and an amplitude of about 20 volts is fed out from the left hand anode circuit at the junction of R19, R20 and via C11 to the gate valve V3 which causes its left hand side to conduct and in turn feed out negative pulses via C13 again with an amplitude of about 20 volts.

The action of V2 is similar to that of V1 except that it will only trigger off on the arrival of pulses via C7 that have larger amplitude than those arriving at the left hand grid of V1. Since the positive bias of V1 is 2.5 volts and that of V2 is 5 volts therefore the channel width is 2.5 volts. This is the width normally set for the analyser but the width may be adjusted by means of potentiometer VR2 from which the normal 5 volts bias is derived. Also, the two bias voltages may be varied together by means of VR3 to shift the channel.

When V2 is triggered, a positive pulse of the duration of about 30 microseconds and amplitude of about 20 volts is fed via C12 to the right hand grid of V3, causing the left hand side to cease conducting due to the cathode-coupled amplifier action of this circuit, thereby acting as a gate and shutting off all pulses in its output anode.

Thus for each pulse arriving at the input IN within an amplitude range of 2.5 to 5 volts, a negative pulse of an amplitude of about 20 volts (adjustable by means of variable resistance VR9) appears at the left hand anode of V3 and is fed through condenser C13 to the following circuit which constitutes the ratemeter 12 of FIG. 1. The integrated count rate for maximum thickness is approximately 10,000 per sec.

The ratemeter consists of a "diode pump" comprising selenium rectifier diodes MR1 and MR2 and tank circuit R49, C14, C15, a fed-back valve voltmeter comprising triode valves V4 and V5A, and a backing-off voltage circuit comprising valve V5B, switch S1/2 and associated resistors.

The output voltage from the "diode pump" which appears across R49 is a function of the pulse count rate from V3 and also the pulse amplitude which is adjustable by means of VR9.

This voltage is applied to the grid of V4 and appears at the cathode of V5A. V4 is a high gain pentode (6AK5 Brimar) D.C. coupled to V5A connected as a cathode follower with 100% feed back to the grid of V4.

The voltage at the cathode of V5A is indicated by a 0-1 ma. meter MA connected thereto through a switch S1/1 and returned to the cathode of triode V5B also connected as a cathode follower. V5A and V5B constitute a double triode 12AT7 (Brimar). The grid voltage of V5B and consequently the backing-off potential applied to the meter MA from the cathode of V5B is selected by a switch S1/2 coupled to switch S1/1. In the switch position shown the grid of V5B is earthed so that there is no backing-off potential applied to the meter. In this position, with the photomultiplier 4 (FIG. 1) disconnected, the meter response is set to zero by means of VR5 in the cathode circuit of V5A to compensate for circuit noise.

In the two further positions of the coupled switches S1, the meter range is varied by the introduction of series resistances R50 and VR5 (range 1) or R48 and VR4 (range 2). Range 1 is for a thickness of steel from 0–¼ inch and range 2 for a thickness from ⅛–⅞ inch.

As previously described, there is a "background" count, when the photomultiplier is connected, due to Compton recoil electrons, even when the instrument is out of contact with a surface (zero thickness). Thus, with this switch S1 in the "set zero" position shown there will be a response on the meter MA which will vary as the gamma ray source decays with time. The response is therefore adjusted to compensate for source decay by means of pulse amplitude control VR9 to give a predetermined reading of 0.8 volt (in the present example) for zero thickness. When the switch S1 is moved to range 1 or range 2 positions, the switch component S1/2 applies the requisite voltages (adjustable by VR7 and VR6 respectively) to the grid of V5B to provide a back-off voltage to return the meter reading for zero thickness.

The values of the various circuit components in the example of anlayser and ratemeter described above with reference to FIG. 5 are:

| | |
|---|---|
| R15 | 470K |
| R16 | 22K |
| R17 | 1.5M |
| R18 | 220Ω |
| R19 | 4.7K |
| R20 | 4.7K |
| R21 | 220Ω |
| R22 | 1M |
| R23 | 33K |
| R24 | 220Ω |
| R25 | 4.7K |
| R26 | 4.7K |
| R27 | 220Ω |
| R28 | 1M |
| R29 | 33K |
| R30 | 47K |
| R31 | 820K |
| R32 | 220Ω |
| R33 | 4.7K |
| R34 | 220Ω |
| R35 | 1M |
| R36 | 33K |
| R37 | 22K |
| R38 | 560K |
| R39 | 220Ω |
| R40 | 27K |
| R41 | 47K |
| R42 | 680K |
| R43 | 220Ω |
| R44 | 1.5M |
| R45 | 47K |
| R48 | 2.9K |
| R49 | 330Ω |
| R50 | 5.6K |
| R51 | 20K |
| R52 | 47K |
| R53 | 220Ω |
| R54 | 120K |
| R55 | 12K |
| C5 | µf .001 |
| C6 | pf 47 |
| C7 | µf .001 |
| C8 | pf 100 |
| C11 | pf .001 |
| C12 | pf .001 |
| C13 | pf .200 |
| C14 | µf 1.0 |
| C15 | µf 2x2.0 |
| C16 | µf 0.1 |
| C17 | µf 0.25 |
| VR2 | 50K |
| VR3 | 25K |
| VR4 | 1K |
| VR5 | 2.5K |
| VR6 | 5K |
| VR7 | 5K |
| VR9 | 5K |

We claim:

1. A thickness gauge comprising a gamma-ray source, an energy-sensitive gamma-ray detector wherein the amplitude of the output of the detector varies with the energy of the input, means mounting said source and said detector such that said source may be placed close to a surface area and such that said detector is directly exposed both to said source and to said surface area, and electronic circuit means comprising a single-channel pulse-amplitude analyzer, said analyzer being adjustable to block most of the pulses due to direct excitation of said detector and to pass pulses which are derived from gamma-rays back-scattered from said surface area, and a rate-meter for indicating the count-rate of those pulses at the output of the detector which are derived solely from gamma-rays back-scattered from said surface area.

2. A thickness gauge as claimed in claim 1 characterized in that said electronic circuit means includes response control means whereby the amplitude of pulses fed to said rate-meter may be adjusted to compensate for variations in the strength of the source.

3. A thickness gauge comprising a gamma-ray source, a scintillation counter including a scintillator and a photomultiplier, means mounting said source and said counter such that said source may be placed close to a surface area and such that said scintillator is directly exposed to said source and to said surface area, and electronic circuit means comprising a single-channel pulse-amplitude analyzer adjustable to pass only pulses from said counter of amplitude corresponding to photoelectric excitation of said scintillator by gamma-rays back-scattered from said surface area and a rate-meter including means for backing-off the count-rate of pulses due to Compton recoil electrons produced in said scintillator by direct radiation from said source and passed by said analyzer, whereby the rate-meter indicates the count-rate of those counter pulses which are derived solely from gamma-rays back-scattered from said surface area.

4. A thickness gauge as claimed in claim 3 wherein said electronic circuit means includes response control means whereby the amplitude of pulses fed to said rate-meter can be adjusted, in the absence of back-scattered gamma-rays, to indicate a given count-rate due to said Compton recoil pulses produced by direct radiation, in order to compensate for variations in the strength of the source.

References Cited in the file of this patent

UNITED STATES PATENTS

| | | |
|---|---|---|
| 2,469,461 | Russell | May 10, 1949 |
| 2,536,131 | Herzog et al. | Jan. 2, 1951 |
| 2,590,057 | Wiegand | Mar. 18, 1952 |
| 2,675,478 | Brunton et al. | Apr. 13, 1954 |
| 2,675,482 | Brunton | Apr. 13, 1954 |

OTHER REFERENCES

Sourcebook on Atomic Energy, Glasstone, page 133, published by D. Van Nostrand Co., Inc., Toronto, N. Y., London, in 1950.

Radioisotopes in Industry, a text edited by Bradford, published by Reinhold Publishing Corp., New York 36, N. Y., in 1953, page 82.